Dec. 4, 1973        H. S. CHURCH        3,776,998
METHOD OF MOLDING RUBBER ARTICLES
Filed Feb. 10, 1972        2 Sheets-Sheet 1

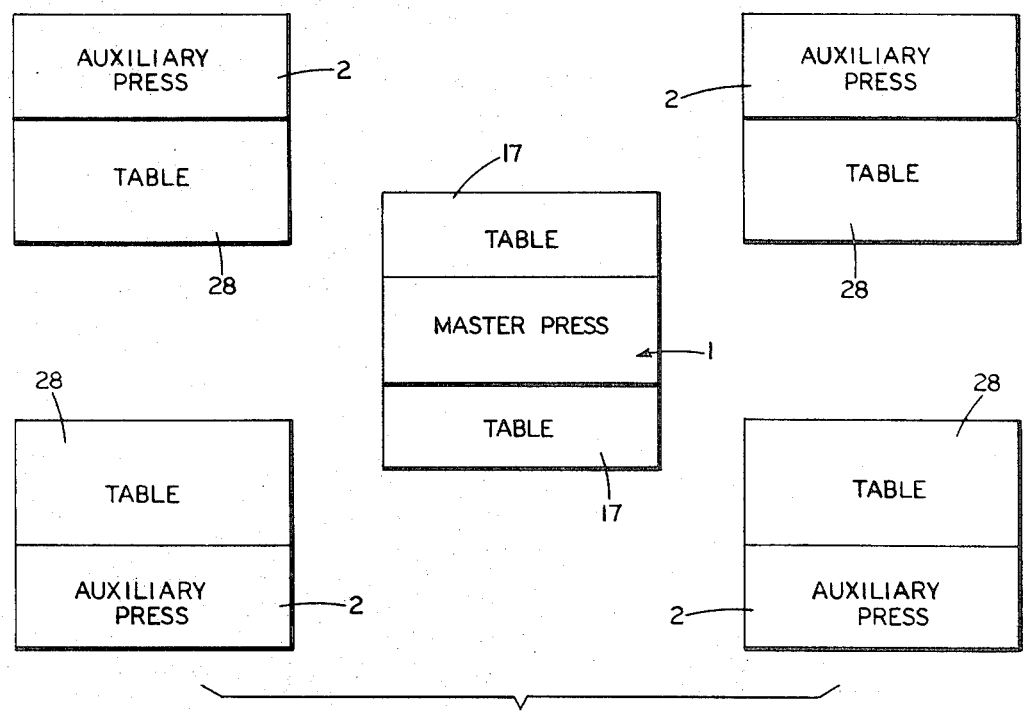
FIG.8
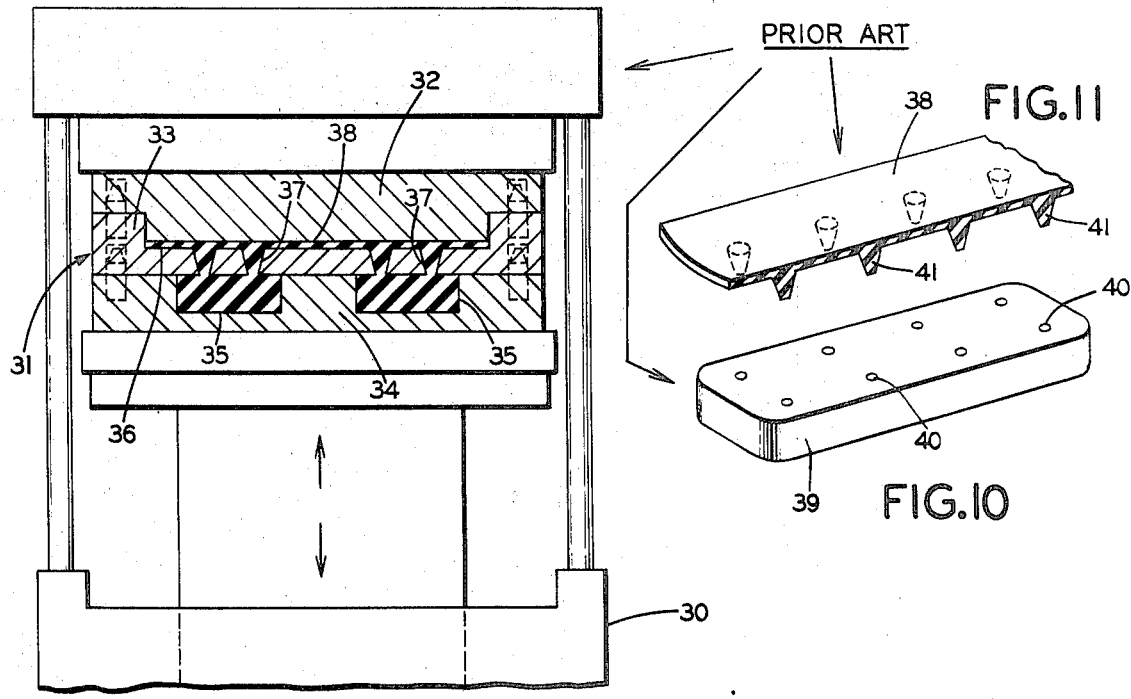
FIG.9
FIG.10
FIG.11

United States Patent Office 3,776,998
Patented Dec. 4, 1973

3,776,998
METHOD OF MOLDING RUBBER ARTICLES
Herman S. Church, Cuyahoga, Ohio, assignor to Teledyne Mid-American Corporation, Hartville, Ohio
Filed Feb. 10, 1972, Ser. No. 225,065
Int. Cl. B29g 3/00
U.S. Cl. 264—294        8 Claims

ABSTRACT OF THE DISCLOSURE

A method of molding rubber articles in which uncured rubber is transferred from the chamber of a pot sprue plate into the cavities of a mold cavity plate by pot plunger pressure in a master press while the uncured rubber in the pot is maintained at a temperature considerably below curing temperature. The sprue plate retained by the master press is separated from the cavity plate, and the cavity plate then is removed from the master press. A mold lid with cavity pressure pads then is placed on the cavity plate with the cavities filled with uncured rubber. The mold lid and cavity plate as a mold unit is pressed in an auxiliary press to cure the rubber under pressure for the necessary time interval at the required curing temperature. The master press may serve a number of auxiliary presses. Fresh uncured rubber is added to the chamber of the master press sprue plate which is maintained at a temperature considerably below curing temperature, before each new cavity plate for a mold unit for one of the auxiliary presses is injected with uncured rubber. The procedure eliminates forming substantially any cured rubber scrap in producing molded articles.

BACKGROUND OF THE INVENTION

Field of the invention

The invention relates to the molding of rubber articles from uncured rubber in molds pressed in typical rubber molding presses at curing temperature, whereby the articles have the desired finished configurations or shapes imparted by the shapes of the cavities formed in the mold cavity plates. More particularly, the invention relates to a method of molding rubber articles which eliminates the formation of substantially all the cured scrap rubber heretofore produced in molding rubber articles in accordance with prior transfer molding procedures.

Description of the prior art

Rubber articles conventionally are molded by procedures known either as "transfer molding" or as "compression molding." In transfer molding, uncured rubber is placed in a chamber called a "pot" formed by a mold plunger plate and a sprue plate. The pot is filled with uncured rubber and sprue holes communicate from the bottom of the chamber to the cavities in a mold cavity plate. When pressure from a hydraulic ram of a molding press is brought to bear on the unit assembly of plunger plate, sprue plate and cavity plate, some of the uncured rubber in the pot is forced through the sprue holes to fill the mold cavities. The three-piece plunger plate-sprue plate-cavity plate mold assembly unit, in entirety, is held under pressure in the press while heat is applied for a sufficient time to effect a cure on the rubber. The curing temperature, and therefore the temperature of the three components of the mold assembly unit, ordinarily is maintained at about 330° F. during curing. The mold units then are stripped and again used for a subsequent molding operation.

In this transfer molding procedure, some rubber remains in the pot, in order to assure that the mold cavities have been filled by transfer from the pot of uncured rubber through the sprue holes as the press is closed and the mold assembly held in the press heated under pressure for the required curing time. This rubber remaining in the pot is cured at the same time that the rubber is curing in the mold cavities. This rubber residue is known as "pot flash" and is useless insofar as value to the product being molded. It has little inherent value and is usually scrapped.

Depending upon the shape of the part being molded, mold design and other factors, such scrap cured rubber may constitute a substantial percentage of the weight of the final molded product. For example, for one rubber product illustrated, the scrap rubber produced, in accordance with conventional transfer molding procedures described, is as much as 15% of the weight of the final molded product.

Compression molding procedures eliminate the "pot flash" scrap and, thus, eliminate the cured rubber scrap produced by prior transfer molding procedures. Compression molding involves carefully weighing uncured rubber charges for the mold cavities, so that the weight of each charge slightly exceeds that of the finished product. The carefully weighed uncured rubber is placed in the mold cavity of a cavity plate and a lid is placed thereon. The lid and cavity assembly then are pressed in a press under pressure in the same manner as in transfer molding and are held under pressure at the curing temperature for the required amount of time.

The slight excess of rubber is needed to assure complete filling of the cavity. The slight excess bleeds into flash grooves designed in the mold. This flash is later removed mechanically or by hand. The amount thereof is much less than the pot flash produced in transfer molding of the same product.

While compression molding eliminates much of the rubber waste associated with transfer molding, expensive weighing procedures must be used. Often, it is impractical to mold complex shapes by compression molding. Further, it is very time consuming to load the individual cavities of a multiple cavity mold with carefully weighed uncured rubber charges.

There has long been a need existing in the art for some manner of eliminating the rubber waste associated with transfer molding and the added expense associated with compression molding.

SUMMARY OF THE INVENTION

Objectives of the invention include providing a new method or procedure for molding rubber articles which eliminates the pot flash waste heretofore characterizing transfer molding procedures; providing a new method of molding rubber articles which eliminates expensive weighing operations and time consuming loading procedures for multiple cavity molds heretofore characterizing compression molding procedures; providing a new procedure for molding rubber articles which retains the advantages and eliminates the difficulties heretofore characterizing both transfer and compression molding procedures; providing a new method of molding rubber articles in which uncured rubber is injected from a pot, as a transfer molding operation into a mold cavity, and the injected rubber in the mold cavity then is cured without producing "pot flash"; providing a new two-step molding procedure in which uncured rubber in a pot at all times is held at a temperature below curing temperature, say 200° and below, during and after injection of some of the uncured rubber in the pot through sprue holes of a sprue plate into a mold cavity, so that no cured rubber scrap is produced; providing a new molding procedure in which mold cavities are filled with uncured rubber by transfer molding procedures, and in which only the rubber in the mold cavities is ever heated to curing temperature; and providing a new method of molding rubber articles which eliminates difficulties heretofore encountered, achieves the various objectives indicated in a simple, effective and inexpensive manner, and solves problems and satisfies needs which long have existed in the art of molding rubber articles.

These objectives and advantages are obtained by the improved rubber molding method, the general nature of which may be stated as including, the steps of forming a reservoir supply of uncured rubber; maintaining the uncured rubber in the reservoir supply at a temperature below curing temperature, say between 180° F. and 270° F., to retain the uncured rubber supply in uncured condition; transferring a charge of uncured rubber from the supply to a mold cavity in which an article is to be molded; adding uncured rubber to the supply after each transfer operation; separating the charge of uncured rubber from the uncured rubber supply; enclosing the charge of uncured rubber in the cavity; pressing the enclosed charge of uncured rubber at curing temperature of say 330° F. to form a molded rubber article; applying pressure to the supply to transfer the charge to a mold cavity; and pressing the rubber in the mold cavity during curing independently of the pressure applied to the reservoir supply.

BRIEF DESCRIPTION OF THE DRAWINGS

Preferred method steps of the invention—illustrative of the best mode in which applicant has contemplated applying the principles—are illustrated somewhat diagrammatically in the drawings, are set forth in the following description, and are particularly and distinctly pointed out and set forth in the appended claims.

FIG. 8 is a diagrammatic view illustrating a master press and a plurality of satellite auxiliary presses served by the master press in production operations using the new molding procedure;

FIG. 9 is a view similar to FIGS. 2 and 4 illustrating a typical prior art transfer molding operation;

FIG. 10 is a perspective view of a molded article produced by the operation illustrated in FIG. 9; and FIG. 11 is a fragmentary view illustrating typical pot flash produced by prior art transfer molding procedures in molding the article of FIG. 10 in the transfer mold assembly unit shown in FIG. 9.

Similar numerals refer to similar parts throughout the drawings.

DESCRIPTION OF THE PREFERRED STEPS OF THE METHOD

Figures 1, 2:
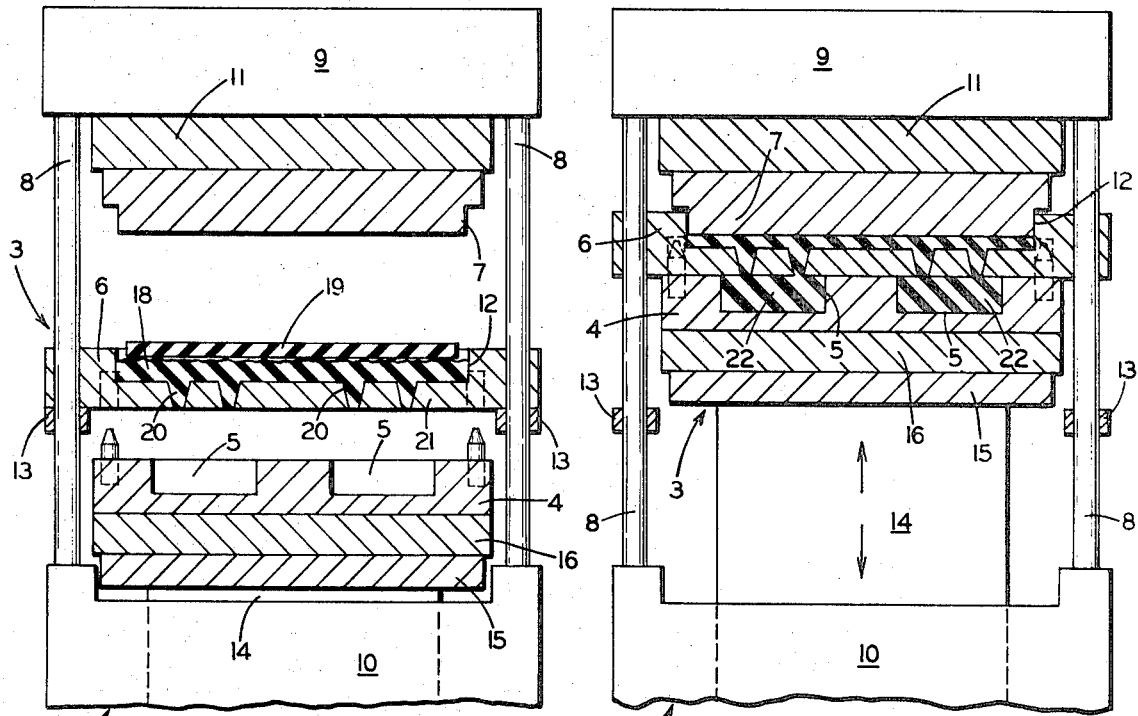
FIG. 1 is a diagrammatic sectional view of the mold components used in a master press in accordance with the invention, with the mold cavity plate open and uncured rubber in the pot compartment of a sprue plate movably mounted on and held by the press and with the press ram in retracted position.
FIG. 2 is a view similar to FIG. 1 showing the mold plate component closed by movement of the hydraulic ram to apply pressure by the plunger carried by the press against the sprue plate and a cavity plate to charge the cavities with uncured rubber.
Figure 3:
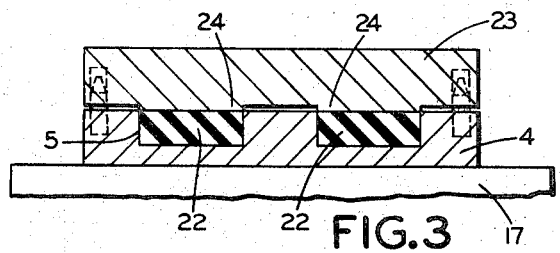
FIG. 3 is a diagrammatic view showing the cavity plate removed from the master press of FIG. 2 with uncured rubber injected in the mold cavities, and also showing a mold lid placed on the cavity plate charged with uncured rubber.

The new method involves the use of two presses to carry out the improved procedure of molding a rubber article or product. The presses comprise a master press generally indicated at 1 and an auxiliary press 2. In production, one master press 1 serves a number of auxiliary presses 2, four auxiliary presses 2 associated with one master press 1 being shown by block diagrams in FIG. 8.

The master press 1 is modified from normal construction and has a cooperative relation to a modified transfer mold assembly unit generally indicated at 3 used in the first stage of the improved method. Mold unit 3 has a cavity plate 4 having any number of cavities 5 formed therein where multiple cavity molds are used. Cavity plate 4 however may contain only a single cavity 5.

Mold 3 also includes a sprue plate 6 and a plunger 7. The sprue plate 6 is slidably mounted on slide rods 8 extending between the press head 9 and press base 10. The plunger 7 is fixed to the upper platen 11 of press 1 and is cooperatively arranged to press into the compartment or chamber 12 of sprue plate 6 to form a modified pot structure, when the mold unit 3 is closed. When the mold unit 3 is opened as shown in FIG. 1, the sprue plate 6 slides down guide rods 8 to a position held by sprue plate stops 13, to allow access to the pot area in order to load uncured rubber.

In the open mold position of FIG. 1 the hydraulic press ram 14 is lowered and the bolstered plate 15 and lower platen 16 are spaced below sprue plate 6. The cavity plate 4 rests on lower platen 16 and may be moved onto or off of platen 16 laterally from or to a work table 17 at one side of the press 1, two worktables 17 for master press 1 being shown in FIG. 8.

FIG. 1 shows uncured rubber 18 residue from the last injection or transfer step in the pot chamber 12, as well as a fresh uncured rubber charge 19. Sprue holes 20 communicate between the bottom of pot chamber 12 and the lower surface 21 of sprue plate 6.

The upper platen 11, sprue plate 6, and lower platen 16 each are equipped with heating means, such as heating elements, so as to control the temperatures of each of members 11, 6 and 16. Preferably, the upper platen 11 is maintained at a temperature of 180° F., the sprue plate 6 at a temperature of 200° F., and the lower platen 16 at a temperature of 330° F. Thus the lower platen heats the cavity plate 4 to the 330° F. temperature which is the normal curing temperature used for curing rubber compound articles. The sprue plate temperature of 200° F. is substantially below curing temperature so that uncured rubber 18–19 contained in the pot chamber 12 remains in an uncured condition.

In FIG. 1 the ram 14 is down, a new mold cavity plate 4 is in position on the lower platen 16, fresh uncured rubber stock 19 has been added to pot chamber 12 in sprue plate 6, and the various parts are ready for a new transfer cycle. This is accomplished by raising ram 14 to the position shown in FIG. 2 which closes mold unit 3. Plunger 7 enters pot chamber 12 and injects uncured rubber 18–19 through sprue holes 20 into cavities 5. The cavities 5 are closed by contact of the upper surface of cavity plate 4 against the lower surface 21 of sprue plate 6. Meanwhile the uncured rubber 18–19 has been heated to between 180° F. and 200° F., which renders it soft enough to be transferred into and fill mold cavities 5. When this transfer operation completely fills cavities 5, the ram 14 is lowered. At this point the rubber 22 in cavities 5 has not cured, and the cavity plate 4 is again in the position of FIG. 1.

Cavity plate 4 then is moved out of press 1 onto a work table 17 where it is fitted with a lid 23. Lid 23 has pressure pads 24 which, when lid 23 is pressed to seat on the top of cavity plate 4, displaces a small volume of rubber 22 in the cavities 5.

Cavity plate 4 and lid 23, as thus assembled, then are moved to an auxiliary press 2 (FIG. 4), placed on the lower platen 25 of press 2, and ram 26 is raised to press the mold unit 4–23 against upper platen 27 of press 2.

Figure 4:
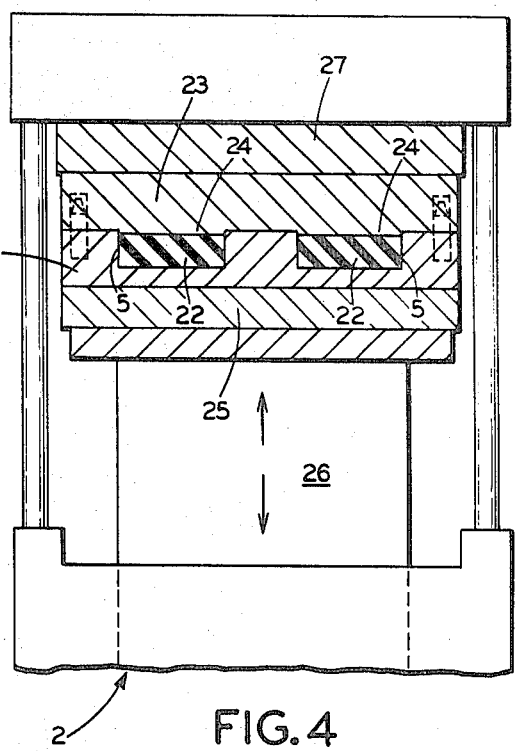
FIG. 4 is a view similar to FIGS. 1 and 2 of an auxiliary press in which a cavity plate and lid, forming the mold assembly unit of FIG. 3, is held under compression at the required curing temperature for the required amount of time to effect a cure.

As the mold unit 4–23 is forced completely closed, as shown in FIG. 4, the slight excess of rubber 22 in the cavities 5 displaced by the pressure pads 24 of lid 23, is forced into flash grooves, not shown, similar to those used in the construction of usual molds for compression molding. The mold unit 4–23, with rubber 22 in its cavities 5 is held under pressure in auxiliary press 2 and cured in the normal manner for the required amount of time at 330° F.

In order to provide and maintain curing temperature, the upper and lower platens 27 and 25 of press 2 are provided with temperature controlled heating means to maintain each platen at a temperature of 330° F. which is the normal curing temperature for rubber composition.

Figures 6, 7:
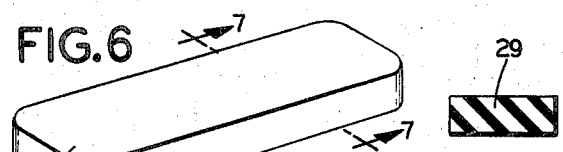
FIG. 6 is a perspective view of a rubber article molded in one of the cavities of the cavity plate shown in FIG. 5.
FIG. 7 is a section looking in the direction of the arrows 7—7, FIG. 6.
Figure 5:
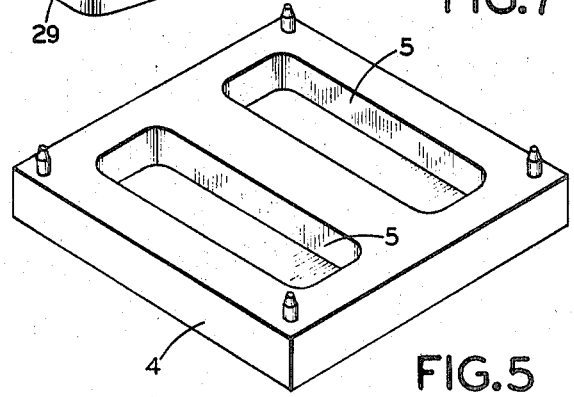
FIG. 5 is a perspective view diagrammatically illustrating the cavity plate of the mold assembly unit shown in FIGS. 3 and 4.

After curing has been completed, ram 26 is lowered, the mold unit 4–23 is removed to a work area 28 for one of the auxiliary presses 2, indicated diagrammatically in FIG. 8. The lid 23 is then removed to expose cavity plate 4 (FIG. 5) and the molded articles then are removed from the cavities 5. A rubber article 29 thus molded is shown in FIGS. 6 and 7 and may have any desired or required shape or configuration, imparted by the shape of the mold cavity 5.

Meanwhile, during the time when the first cavity plate 4 is on a work area 17 and is being fitted with a lid 23, and thereafter placed in one of the auxiliary presses 2, a second empty cavity plate 4 is positioned on the lower platen 16 of master press 1, as shown in FIG. 1. Additional uncured rubber 19 is placed in the pot on top of the residue 18 remaining therein after transfer of rubber into the first described cavity plate 4.

The second cavity plate 4 is closed by raising ram 14 against sprue plate 6 and fixed plunger 7, and uncured rubber is ejected into the cavities 5 of the second cavity plate 4. When the cavities are completely filled, ram 14 is lowered, and the second cavity plate 4 is removed and fitted with another lid 23 and placed in another auxiliary press 2.

These operations are continued with additional cavity plates 4 which are charged with uncured rubber in master press 1 and supplied to one of a number of adjacent auxiliary presses 2 until the first used cavity plate 4 has been stripped, cleaned and again in condition for being charged with uncured rubber in master press 1.

Thus, one master press 1 is used in conjunction with a number of auxiliary presses. The rubber residue 18 in the master press sprue plate 6 left from one transfer operation is used with the addition of more uncured rubber 19 for the next transfer operation and so on.

FIGS. 9, 10 and 11 illustrate the prior art practice of transfer molding a rubber article similar to the article 29 shown in FIG. 6. A usual press 30, which may be similar to or identical with auxiliary press 2, is used and a three-part transfer mold also is used indicated generally at 31. The mold 31 is composed of a plunger plate 32, a sprue plate 33 and a cavity plate 34 having cavities 35 therein. A pot chamber 36 is formed in sprue plate 33 with sprue holes 37 communicating with chamber 36 and the cavities. 35. The three-part transfer mold 31, when closed (FIG. 9), is similar to the arrangement shown in FIG. 2 of the master press with the modified mold assembly, except that the unit 3 has its sprue plate slidably mounted on the slide rods 8 of press 1, and the sprue plate 6 is arranged to be stopped by stops 13 part-way between cavity plate 4, and plunger 7 fixed to the upper platen 11, when the press is opened as shown in FIG. 1.

Further, the pot chamber 36 in three-part transfer mold 31 is shallower than the chamber 12 in sprue plate 6. This is to minimize the amount of residue rubber 38 in the pot chamber 36 in the conventional prior art transfer molding equipment and procedure. This residue 38 produces the scrap shown in FIG. 11 at the completion of the molding operation. At this time, the three-part mold 31 is removed from the press 30, the plunger plate 32, is removed, then the sprue plate 33 is removed from the cavity plate 34, leaving the molded articles 39 in the cavities 35.

Transfer molding marks 40 appear on the product 39 where the rubber residue breaks away from the product 39 at the ends of the scrap rubber projections 41 which remain in the sprue holes 37. This pot flash residue rubber 38 and the projections 41 comprise cured rubber and have no useful product value insofar as the molded product 39 is concerned and constitutes scrap rubber which may amount to about 15% of the weight of the molded products produced in the three-part transfer mold 31. The molded article 29 produced in accordance with the invention, as shown in FIG. 6 is free of the transfer mold marks 40 which identify and characterize molded product 39 produced in accordance with prior art transfer molding procedure.

In accordance with the concepts of the present invention, excess material or residue 18 is deliberately left in the chamber 12 between successive injections or transfer of uncured rubber into successive cavity plate 4. The relatively thick cross section of the deliberately retained excess material or residue 18 is slow to begin curing and hence it is possible to extend the time between transfer operations. At the same time, the pre-warmed stock being transferred to the cavities 5 of cavity plate 4 assists in the ready transfer of the stock and may reduce slightly the overall curing time in the auxiliary press 2, of FIG. 4.

A further distinguishing feature of the new concept of the invention involves the three different temperature controlled sections in the master press wherein the upper platen 11, the sprue plate 6 and the lower platen 16 each are maintained at different controlled temperatures as described. This differential controlled concept allows the uncured rubber in the pot chamber 12 to remain uncured between transfers yet the rubber is warm enough to transfer easily. The sprue plate 6 is kept slightly warmer than the upper platen 11 to aid the uncured rubber in sticking to the sprue plate when the chamber 12 is opened by separation of plunger 7 for the addition of new stock.

In the usual or conventional transfer or compression molding procedures, it is the usual practice to control the temperatures only on the upper and lower platens, both normally being held at a temperature of 330° F.

An upper platen temperature of 180° F. and a sprue plate temperature of 200° F. has been described above in connection with the temperature control of these elements of the equipment. These are preferred minimum temperatures. That is, the upper platen 11 may be maintanied at a temperature of up to 250° F. and the sprue plate 6 may be maintained at a temperature of up to 270° F. which are the preferred maximum temperatures that may be conveniently used in accordance with the invention.

In other words, a preferred temperature range for the controlled temperature of platen 11 is from 180° F. to 250° F., and a preferred temperature range for the controlled temperature of sprue plate 6 is from 200° F. to 270° F. These temperatures can be adjusted within the ranges indicated, depending upon the character of rubber stock or compound used, the nature, configuration or size of the rubber articles being molded, and the molding time cycle, so as to provide for maximum transfer speed and minimum curing time while retaining at all times the uncured rubber in the pot of the master press in an uncured condition between successive transfers or injections.

An alternative to the differential temperature control between plunger 7 and sprue plate 6, is to provide the plunger 7 with an extremely fine, smooth or polished surface finish, such as by chrome plating, to discourage sticking of the uncured rubber to the smooth surfaced plunger 7 and to encourage sticking of the uncured rubber residue 18 in the pot chamber 12 of sprue plate 6.

Accordingly, the advantages achieved by the new procedures of the present invention are the elimination of pot flash in transfer molding with the accompanying cost savings; the prewarming of the stock without auxiliary equipment resulting in shorter curing cycles; and the production of molded articles by transfer molding procedures without leaving transfer molding injection or sprue marks on the molded product.

The present invention thus provides an improved method of molding ruber articles which achieves the stated objectives, eliminates difficulties which have characterized prior art transfer and compression molding procedures, and solves problems that have long existed in the art.

In the foregoing description, certain terms have been used for brevity, clearness and understanding but no unnecessary limitations are to be implied therefrom beyond the requirements of the prior art because such terms are used for descriptive purposes herein and are intended to be broadly construed.

Moreover, the description and illustration of the invention is by way of example and the scope of the present invention is not limited to the exact details of construction.

Having now described the features, discoveries and principles of the invention, the manner in which the improved rubber article molding procedure is carried out, the characteristics of the new concept, and the advantageous, new and useful results obtained; the new and useful methods, steps and procedures are set forth in the appended claims.

I claim:

1. The method of molding rubber articles including the steps of forming a reservoir supply of uncured rubber; maintaining the uncured rubber in the reservoir supply at a heated temperature below curing temperature to retain the uncured rubber supply in a soft, workable, uncured condition; transferring a charge of the heated, soft uncured rubber from the supply to a mold cavity in which an article is to be molded; separating the charge of uncured rubber in the civity from the uncured rubber supply; enclosing the charge of uncured rubber in the cavity; pressing the enclosed charge of uncured rubber in the cavity to displace rubber in the cavity; curing the uncured rubber while held under pressure in the cavity at curing temperature to form a molded rubber article; and retaining the remaining uncured rubber in the reservoir supply after a charge of rubber is transferred from the supply to a mold cavity to be used as at least a portion of the supply of uncured rubber for the next succeeding charge.

2. The method defined in claim 1 in which uncured rubber is added to the residue of uncured rubber in the reservoir supply after each operation of transferring a charge of uncured rubber from the supply to a mold cavity.

3. The method defined in claim 2 in which the uncured rubber in the reservoir supply is maintained at a temperature between 180° F. and 270° F., and in which the charge of uncured rubber enclosed in the mold cavity is cured at a temperature of 330° F.

4. The method defined in claim 2 in which pressure is applied to the reservoir supply of uncured rubber to transfer a charge of uncured rubber from the supply to a mold cavity; and in which the charge of uncured rubber enclosed in the mold cavity is pressed at curing temperature during curing independently of applying pressure to the reservoir supply of uncured rubber.

5. The method of molding rubber articles including the steps of supplying uncured rubber to a rubber molding master press sprue plate pot chamber; maintaining the uncured rubber in the sprue plate pot chamber at a temperature between 180° F. and 270° F. to retain the uncured rubber in a soft, workable uncured condition; assembling a mold plate having mold cavities with the sprue plate; transfer pressing a predetermined quantity of uncured rubber in the master press from the pot through sprue holds in the sprue plate into the mold plate cavities to completely fill said cavities; separating the mold plate from the sprue plate; removing the mold plate from the master press; assembling a pressure pad lid with the mold plate having pads thereon entering the mold plate cavities to pressingly engage and displace the uncured rubber charge in the mold plate cavities; heating the lid and mold plate assembly with the uncured rubber charge held under pressure in said mold plate cavity at curing temperature in an auxiliary press to form molded rubber articles; retaining the residue of uncured rubber in the pot chamber after transferring enough uncured rubber from the pot chamber to fill the mold plate cavities; and using said uncured rubber residue for at least a portion of the quantity transferred to cavities of a next succeeding mold plate.

6. The method defined in claim 5 in which uncured rubber is added to the residue after each transfer of uncured rubber from the pot to mold plate cavities.

7. The method defined in claim 5 in which the master press has a plunger which presses uncured rubber from the pot into the mold plate cavities; in which the plunger is maintained at a temperature between 180° F. and 250° F.; and in which the sprue plate is maintained at a temperature between 200° F. and 270° F.

8. The method defined in claim 5 in which a plurality of mold plates and lids are provided; in which a plurality of auxiliary presses are provided; in which a plurality of uncured rubber transfer operations from pot to mold cavities are carried out on the master press during curing of the rubber articles in any one of the plurality of lid and mold plate assemblies in any one of the plurality of auxiliary presses.

References Cited
UNITED STATES PATENTS

| | | | |
|---|---|---|---|
| 2,777,441 | 1/1957 | Geisle | 264—328 X |
| 2,385,318 | 9/1945 | Wiley | 264—329 X |
| 2,738,551 | 3/1956 | Howald | 264—328 |
| 3,483,287 | 12/1969 | Davis | 264—328 X |

FOREIGN PATENTS

| | | | |
|---|---|---|---|
| 1,324,079 | 3/1963 | France | 264—328 |

ROBERT F. WHITE, Primary Examiner

R. R. KUCIA, Assistant Examiner

U.S. Cl. X.R.
264—297, 328, 329